(12) United States Patent
Jordan

(10) Patent No.: US 10,088,046 B2
(45) Date of Patent: Oct. 2, 2018

(54) SEALING SYSTEM HAVING PRESSURE RELIEF ELEMENTS AND USE OF A SEALING SYSTEM TO PRODUCE AN INTERMEDIATE-SPACE PRESSURE CASCADE

(71) Applicant: Trelleborg Sealing Solutions Germany GmbH, Stuttgart (DE)

(72) Inventor: Holger Jordan, Neuhausen a.d.F. (DE)

(73) Assignee: TRELLEBORG SEALING SOLUTIONS GERMANY GMBH, Stuttgart (DE)

( * ) Notice: Subject to any disclaimer, the term of this patent is extended or adjusted under 35 U.S.C. 154(b) by 0 days.

(21) Appl. No.: 15/636,487

(22) Filed: Jun. 28, 2017

(65) Prior Publication Data

US 2017/0299058 A1   Oct. 19, 2017

Related U.S. Application Data

(63) Continuation of application No. PCT/EP2016/050820, filed on Jan. 15, 2016.

(30) Foreign Application Priority Data

Jan. 16, 2015   (EP) .................................... 15151542

(51) Int. Cl.
| | | |
|---|---|---|
| *F16J 15/00* | (2006.01) | |
| *F16J 15/16* | (2006.01) | |
| *F16J 15/32* | (2016.01) | |
| *F16J 15/56* | (2006.01) | |
| *F16J 15/3236* | (2016.01) | |
| *F16J 15/3208* | (2016.01) | |
| *F16J 15/3284* | (2016.01) | |

(52) U.S. Cl.
CPC .......... *F16J 15/006* (2013.01); *F16J 15/164* (2013.01); *F16J 15/3236* (2013.01); *F16J 15/002* (2013.01); *F16J 15/3208* (2013.01); *F16J 15/3284* (2013.01); *F16J 15/56* (2013.01)

(58) Field of Classification Search
CPC ........ F16J 15/002; F16J 15/006; F16J 15/164; F16J 15/3204; F16J 15/3208; F16J 15/56
See application file for complete search history.

(56) References Cited

U.S. PATENT DOCUMENTS

| | | | | |
|---|---|---|---|---|
| 4,284,280 A | * | 8/1981 | Bertram ................. | F16J 15/006 277/558 |
| 6,113,108 A | * | 9/2000 | Friend .................... | F16J 15/164 277/549 |

(Continued)

FOREIGN PATENT DOCUMENTS

| | | |
|---|---|---|
| EP | 0 052 689 A1 | 6/1982 |
| EP | 1 991 800 B1 | 11/2008 |

(Continued)

*Primary Examiner* — Nicholas L Foster
(74) *Attorney, Agent, or Firm* — Hackler Daghighian Martino and Novak

(57) ABSTRACT

A sealing system is between two components, which are translatorily movable relative to each other along a motional axis for sealing off a high-pressure side from a low-pressure side. The sealing system includes pressure relief elements. The use of such a sealing system produces an intermediate-space pressure cascade.

8 Claims, 1 Drawing Sheet

(56) References Cited

U.S. PATENT DOCUMENTS

| | | | | |
|---|---|---|---|---|
| 6,290,235 B1* | 9/2001 | Albertson | ............... | F16J 15/002 |
| | | | | 277/510 |
| 6,595,524 B1* | 7/2003 | Zitting | ................... | F16J 15/164 |
| | | | | 277/436 |
| 6,896,269 B2* | 5/2005 | Jackson | ................. | F16J 15/002 |
| | | | | 277/544 |
| 7,083,170 B2* | 8/2006 | Borstel | ................. | F16J 15/164 |
| | | | | 277/459 |
| 8,413,994 B2* | 4/2013 | Jordan | ................. | F16J 15/164 |
| | | | | 277/552 |
| 8,496,251 B2* | 7/2013 | Ajiki | ................... | F16J 15/3232 |
| | | | | 277/549 |
| 8,608,177 B2* | 12/2013 | Ajiki | ................... | F16J 15/3232 |
| | | | | 277/549 |
| 8,840,115 B2* | 9/2014 | Johnson | ................... | F16J 15/56 |
| | | | | 277/552 |
| 2002/0153665 A1* | 10/2002 | Borstel | ................. | F16J 15/164 |
| | | | | 277/560 |
| 2009/0166984 A1* | 7/2009 | Matsui | ................... | C08G 18/10 |
| | | | | 277/562 |

FOREIGN PATENT DOCUMENTS

| | | |
|---|---|---|
| JP | 2008 144784 A | 6/2008 |
| JP | 2009 528481 A | 8/2009 |

* cited by examiner

SEALING SYSTEM HAVING PRESSURE RELIEF ELEMENTS AND USE OF A SEALING SYSTEM TO PRODUCE AN INTERMEDIATE-SPACE PRESSURE CASCADE

CROSS-REFERENCE TO RELATED APPLICATIONS

This continuation application claims priority to PCT/EP2016/050820 filed on Jan. 15, 2016 which has published as WO 2016/113414 A1 and also the European patent application number 15 151 542.6 filed on Jan. 16, 2015, the entire contents of which are fully incorporated herein with these references.

FIELD OF THE INVENTION

The invention relates to a sealing system between two components, which are translatorily movable relative to each other along a motional axis, for sealing off a high-pressure side from a low-pressure side, wherein an outer component has a first annular groove, which is open to an inner component and is facing toward (disposed closer to) the low-pressure side (N), and at least a second annular groove, which is open to the inner component and is facing toward (disposed closer to) the high-pressure side. In the first annular groove is provided a sealing arrangement, which has a first sealing ring, made of an elastically deformable material, which bears against the inner component, and a first pretensioning ring, made of an elastically deformable material, which radially tensions the first sealing ring and seals it off from the first annular groove. In every second annular groove is provided a pressure relief element, which has a second sealing ring, made of an elastically deformable material, which bears against the inner component, and a second pretensioning ring, made of an elastically deformable material, which radially tensions the second sealing ring and seals it off from the second annular groove.

The second sealing ring has a sealing edge having a high-pressure-side contact surface angle and a low-pressure-side contact surface angle, wherein to each pressure relief element is assigned at least one connecting channel, via which an intermediate space between the sealing arrangement and the first pressure relief element is connectable to the high-pressure side, or an intermediate space between two adjacent pressure relief elements is connectable to the high-pressure side, or two adjacent intermediate spaces are connectable to each other via the connecting channel.

Each connecting channel, in a pressure situation $P_{ZN}>P_H$ or $P_{ZN}>P_{ZH}$, is closed and, in a pressure relief situation $P_{ZN} \geq P_H + P_{crit}$ or $P_{ZN} \geq P_{ZH} + P_{crit}$, is open, wherein $P_H$ is the hydraulic pressure on the high-pressure side, $P_{ZN}$ the hydraulic pressure in the low-pressure-side intermediate space, $P_{ZH}$ the hydraulic pressure in the high-pressure-side intermediate space, and $P_{crit}$ a pressure increase value at which, or in excess of which, the connecting channel is open, and wherein $P_{crit}$ is defined by a deformation of the second pretensioning ring. The connecting channel, in the pressure situation $P_{ZN}>P_H$ or $P_{ZN}>P_{ZH}$, is closed off by the second pretensioning ring, and the high-pressure-side contact surface angle of the sealing edge of the second sealing ring is less than or equal to the low-pressure-side contact surface angle of the sealing edge, so that in the pressurized state, and upon a to-and-fro movement of the inner component in the outer component, there is set for the sealing ring a specific leakage rate, via which the hydraulic pressure in the low-pressure-side intermediate space is adjusted.

BACKGROUND OF THE INVENTION

A sealing system of this type is known from EP 1 991 800 B1. However, the known sealing system is associated with a high complexity of assembly and is expensive to produce.

The object of the invention is therefore to define a sealing system having the aforesaid technical advantages, which, all in all, is easier and cheaper to produce.

The object according to the invention is achieved by a sealing system having the features defined in patent claim 1.

SUMMARY OF THE INVENTION

In the sealing system according to the invention, the second sealing ring and the second pretensioning ring of at least one pressure relief element are configured in one piece with each other and consist of polyurethane, wherein $P_{crit}$ is defined by an at least portional deformation of the second pretensioning ring in a direction radial to the motional axis. The second sealing ring and the second pretensioning element can hence be jointly produced as a single component from an inexpensive material, and with lower production tolerances overall. Furthermore, the assembly of the sealing system is thereby simplified. The sealing system according to the invention can hence be produced, all in all, more easily and more cheaply.

According to the invention, the complexity of production and assembly of the sealing system, in the case of a plurality of pressure relief elements, can once again be further reduced by the second sealing ring and the second pretensioning ring of each pressure relief element being configured in one piece with each other and consisting of polyurethane.

In the sealing system according to the invention, the pressure on the high-pressure side does not bear directly against the primary seal. This advantage particularly has an impalt where a plurality of pressure relief elements are arranged connected in series. In that structure of a sealing system which comprises a sealing arrangement and one or more pressure relief elements, one or more intermediate spaces are provided between the pressure relief element(s) and the sealing arrangement. During hydraulic operation, in the individual intermediate spaces separated from one another by pressure relief elements different hydraulic pressures can be generated. The pressure difference between adjacent intermediate spaces determines the pressure to which the corresponding pressure relief element is subjected. To each pressure relief element is assigned at least one connecting channel for relieving the pressure in the low-pressure-side intermediate space which borders said pressure relief element on the low-pressure side. Each connecting channel connects the low-pressure-side intermediate space, in which the hydraulic pressure $P_{ZN}$ obtains, to the high-pressure-side intermediate space which is facing toward the high-pressure side and in which the hydraulic pressure $P_{ZH}$ obtains, or to the high-pressure side having the high-pressure $P_H$. The connecting channel, in a base pressure situation $P_{ZN} \leq P_{ZH}$ or $P_{ZN} \leq P_H$ of the sealing system, in which the pressure $P_{ZN}$ in the low-pressure-side intermediate space is less than or equal to the pressure $P_{ZH}$ in the high-pressure-side intermediate space or the pressure $P_H$ on the high-pressure side, is closed. In the base pressure situation, the sealing ring seals off the high-pressure-side intermediate space or the high-pressure side from the low-pressure-side intermediate space. The connecting channel according to the invention remains closed also in an inverted pressure situation $P_{ZN}>P_{ZH}$ or $P_{ZN}>P_H$, in which the low-pressure-side intermediate-space pressure exceeds the high-pressure-side pressure and in which the sealing ring seals off the low-pressure-side intermediate space from the high-pressure-side intermediate space or from the high-pressure side. Only once a pressure relief situation $P_{ZN} \geq P_{ZH}+P_{crit}$ or $P_{ZN} \geq P_H + P_{crit}$ is achieved, in which a pressure increase value $P_{crit}$ is reached or exceeded, is the connecting channel opened. The pressure increase value $P_{crit}$ constitutes a critical opening pressure for the connecting channel and is defined by a deformation of the pretensioning ring.

The relieving of pressure through the unidirectionally effective connecting channels is particularly advantageous if a plurality of pressure relief elements are lined up in a row. During hydraulic operation, the hydraulic pressure in the intermediate spaces can rise in different measure. The relieving of pressure in an intermediate space depends solely on the pressure of a further intermediate space, namely the next on the high-pressure side. As soon as the pressure difference $P_{ZN}-P_{ZH}$ between the two intermediate spaces bordering the pressure relief element, or $P_{ZN}-P_H$ between the intermediate space and the high-pressure side, reaches the respective pressure increase value $P_{crit}$, $P_{ZN}-P_{ZH}=P_{crit}$ or $P_{ZN}-P_H=P_{crit}$, the corresponding connecting channel is opened, so that a pressure equalization between the mutually connected pressure regions or intermediate spaces takes place. This has the effect that, in the sealing system according to the invention, an intermediate space at all pressures $P_{ZN}-P_{ZH} \geq P_{crit}$, in particular at intermediate-space pressures $P_{ZN}$, $P_{ZH}<P_H$ beneath the hydraulic operating pressure obtaining on the high-pressure side, is relieved of pressure. The high-pressure-side contact surface angle of the sealing edge of the second sealing ring is respectively less than or equal to the low-pressure-side contact surface angle of the sealing edge, so that, in the pressurized state and upon a to-and-fro movement of the inner component in the outer component, for the sealing ring there is set a specific leakage rate, via which the hydraulic pressure in the low-pressure-side intermediate space is adjusted.

For the sealing mechanism, the pretension and the contact pressure curve of the dynamic sealing is of fundamental importance. The pretension is produced upon the installation of the inner component into the outer component. The contact pressure curve corresponds to the tension transmitted from a pressure-fluid-loaded surface of the sealing ring to the sealing surface. The balance of dragged-in oil film to dragged-out lubricating film forms the leakage rate. The hydrodynamic leakage rate is defined by the pressure gradient in the contact region in the direction of the high-pressure side. The pressure gradient depends on the contact surface angles between the sealing edge and the inner component which is to be sealed off. An, on the high-pressure side, steep contact surface angle produces a steep pressure gradient and a low leakage rate, whereas a high-pressure-side, shallow contact surface angle leads to a shallow pressure gradient and a higher leakage rate.

As long as the recirculation capacity of a sealing system is greater than or equal to the discharged oil quantity, it is possible to speak of leaktight systems. Therefore the first sealing ring of the sealing arrangement which is disposed in the first annular groove and serves as the primary seal in the sealing system according to the invention has a steep pressure gradient. At the pressure relief elements, leakage rates, by contrast, are permitted in a controlled manner, in that the sealing edges of the corresponding sealing rings have symmetrical contact surface angles or asymmetrical contact surface angles, with smaller contact surface angle on the high-pressure side than on the low-pressure side, and consequently possess shallow pressure gradients. Moreover, the sealing edges are rounded. This offers production engineering advantages and enables a yet further improved life of the sealing system. Via the rounding of the sealing edge, the so-called drag angle between sealing ring and moved component for the provision of a specific leakage rate in the pressurized state can be altered and adapted to the system requirements. For the radially inner supporting of a respective second sealing ring, according to the invention a support ring is provided. The support ring is here preferably configured such that, upon pressurization of the second sealing ring or of the relevant pressure relief element, at the same time an unwanted extrusion of the second sealing ring into the low-pressure-side intermediate space, i.e. the low-pressure-side sealing gap between the inner and the outer component, is countered. With a view to a low friction between the inner and the outer component, the support ring can be arranged at a radial distance from the inner component—i.e. in a contact-free manner. Naturally, the support ring can also bear against the inner component or the component which is moved to and fro. In particular for the latter case, the support ring advantageously has an inner side facing toward the second component and having a radius. The inner side of the support ring hence bulges out radially in the direction of the inner component, thus is of convex design. All in all, including in the case of a support ring which, at least in the pressurized operating state of the sealing system, bears against the inner component, a reliable drag behavior, hence an optimized lubrication of the sealing system, can thereby be ensured.

The high-pressure-side and low-pressure-side contact surface angles are chosen such that, in the pressurized state and upon a to-and-fro movement of the inner component in the outer component, there is set a leakage rate which is respectively defined for each sealing ring and via which the hydraulic pressure in the intermediate space which borders the respective pressure relief element on the low-pressure side is adjusted. Via the contact surface angles, the hydrodynamic leakage for each pressure relief element is chosen such that, in each intermediate space, a specific hydraulic pressure obtains. In this way, in the sealing system according to the invention, defined intermediate-space pressures are set, which in a preferred embodiment decrease in a cascade-like manner from the high-pressure side to the low-pressure side. At each pressure relief element and at the sealing arrangement is defined a pressure rating, the level of which corresponds to the pressure difference obtaining at the corresponding element. The sealing system according to the invention possesses, in addition to the hydrodynamic recirculation capacity of the sealing rings, a hydrostatic expansion capability via the connecting channels provided in the pressure relief elements. The valve function of the connecting channels leads to a relieving of pressure in an intermediate space in the event of rise in the intermediate-space pressure to above the intermediate-space pressure in the intermediate space which is next on the high-pressure side, plus the corresponding pressure increase value.

Given an optimal layout of the individual elements of the sealing system according to the invention, the system pressure or working pressure in a hydraulics system can be increased without curtailing the functionality or working life of the sealing system. As a result of a defined pressure behind a pressure relief element, even the lubricating film formation in the sealing gap of the pressure seal can be improved, which in turn positively influences the friction and the working life of the total system. This optimized state is achieved by an adjustability of the opening pressure of the pressure ventilation in the pressure relief element, that is to say of the corresponding pressure increase value. The low-pressure-side mouth opening, or the low-pressure-side end of the connecting channel, is placed axially differently on the inner or outer diameter of the second sealing ring or of the second pretensioning ring or in the second annular groove, so that, by the pressure-dependent mutual displacement of the pressure relief elements, a greater or lesser opening pressure is set.

Through the interplay of hydrodynamic pumping capacity and hydrostatic pressure relief, a long life with improved or no leakages to the outside can be achieved, even under unfavorable operating conditions, with a sealing system comprising, for instance, a pressure seal with pressure relief channel and a downstream secondary seal.

According to a particularly preferred refinement of the invention, also the first sealing ring and the first pretensioning ring of the sealing arrangement of the sealing system are configured in one piece with each other. As a result, the production complexity of the sealing system can be reduced still further. In this case, from cost aspects, the sealing arrangement can likewise consist of polyurethane.

According to the invention, the second pretensioning ring of the pressure relief element preferably has a leg, which is configured in the manner of a sealing lip and which, in the base pressure situation $P_{ZN} > P_H$ or $P_{ZN} > P_{ZH}$ of the sealing system, bears with a sealing edge sealingly against the groove bottom of the second annular groove, and wherein the sealing-lip-like leg, in the pressure relief situation—as a result of its radially directed deflection in relation to the sealing ring—is moved with its sealing edge out of the sealing contact against the groove bottom. The second pretensioning ring thereby releases a fluid stream, serving for pressure equalization, via the connecting channel. The second pretensioning ring can here have, in particular, an angled or L-shaped cross section, with a first and a second leg. The first leg here extends away from the second sealing ring in the radial direction, and the second leg, configured in the manner of a sealing lip, extends axially in the direction of the high-pressure region of the sealing system.

According to the invention, at least one of the connecting channels can comprise a through bore disposed in the pressure relief element, and/or groove portions which are open toward the second annular groove and are configured on the pressure relief element and/or in the outer component.

Insofar as the through bore or the groove portions are configured on the pressure relief element, the sealing system according to the invention can be simplified, and upgraded without large cost expenditure in respect of existing sub-assemblies.

The groove portions can be disposed, in particular, on a low-pressure-side end face of the pressure relief element, on an outer side, facing toward the groove bottom of the second annular groove, of the second pretensioning ring, and/or on an end face, facing toward the high-pressure side H, of the second sealing ring of the pressure relief element. It is of fundamental importance that the sealing-lip-like leg of the pretensioning element can be subjected, by the groove portions or the through bores of the connecting channel, to the pressure prevailing in the intermediate space disposed on the low-pressure side, even if the pressure relief element is pressed against the low-pressure-side groove flank of the second annular groove. Furthermore, as a result of the connecting channel in the pressure relief situation, a fluid stream, directed to the high-pressure side, of the respective pressure medium must be ensured, even if the pressure relief element, in the pressure relief situation, is pressed against the high-pressure-side groove flank of the second annular groove.

In a further preferred embodiment of the sealing system according to the invention, the outer component is a housing, in particular a cylinder, and the inner component is a piston rod of a piston guided in the housing. Naturally, the annular grooves can alternatively also be configured in the inner component. Housing-piston units are often hydraulic systems with high operating pressures. An inventive arrangement and embodiment of pressure relief elements lends itself to relieving a primary seal which in such systems is under high-pressure load. The sealing arrangement can be completed by a scraping ring, disposed in a further annular groove, for cleaning the piston rod which is to be retracted.

The invention further comprises the use of a sealing system according to the invention to produce an intermediate-space pressure cascade, wherein the hydraulic pressures in the intermediate spaces are set such that at every second sealing ring the same pressure difference obtains. The advantage of such a use of the sealing system according to the invention lies in the fact that all pressure relief elements contribute in equal measure to the pressure relief of the primary seal, which is under high-pressure load. The individual components of such an equal-stepped intermediate-space pressure cascade are evenly stressed, whereby the working life of the total sealing system is increased. The pressure relief element can be arranged in the second annular groove such that the sealing ring and the pretensioning ring, in an inverted pressure situation $P_{ZN} > P_{ZH}$ or $P_{ZN} > P_H$, are displaced toward the high-pressure side. In the event of further rise in pressure, the pretensioning ring is deformed until, when the pressure relief situation $P_{ZN} \geq P_{ZH} + P_{crit}$ or $P_{ZN} \geq P_H + P_{crit}$ is reached, the as yet still closed connecting channel is opened up, so that the pressure medium can flow through the connecting channel from the low-pressure-side intermediate space into the high-pressure-side intermediate space. The pressure increase value $P_{crit}$ corresponds to that deformation force per unit area which is to be expended for the opening-up of the connecting channel. The pressure medium present in the low-pressure-side intermediate space flows off via the connecting channel into the high-pressure-side intermediate space until the establishment of a pressure situation $P_{ZN} - P_{ZH} < P_{crit}$ or $P_{ZN} - P_H < P_{crit}$, in which the pressure difference $P_{ZN} - P_{ZH}$ obtaining at the pressure relief element lies beneath the pressure increase value $P_{crit}$ and the connecting channel is closed off again by a corresponding relief, deformation and/or displacement of the pretensioning ring and/or of the sealing ring. After the pressure relief, a pressure $P_{ZN} \approx (P_{ZH} + P_{crit})$ obtains in the low-pressure-side intermediate space, which pressure lies beneath the high-pressure-side pressure plus pressure increase value.

BRIEF DESCRIPTION OF THE DRAWINGS

Further advantages of the invention emerge from the description and the figures of the drawing. Below, the invention is explained on the basis of an illustrative embodiment represented in the drawing, wherein.

DETAILED DESCRIPTION OF THE PREFERRED EMBODIMENTS

Figure 1:
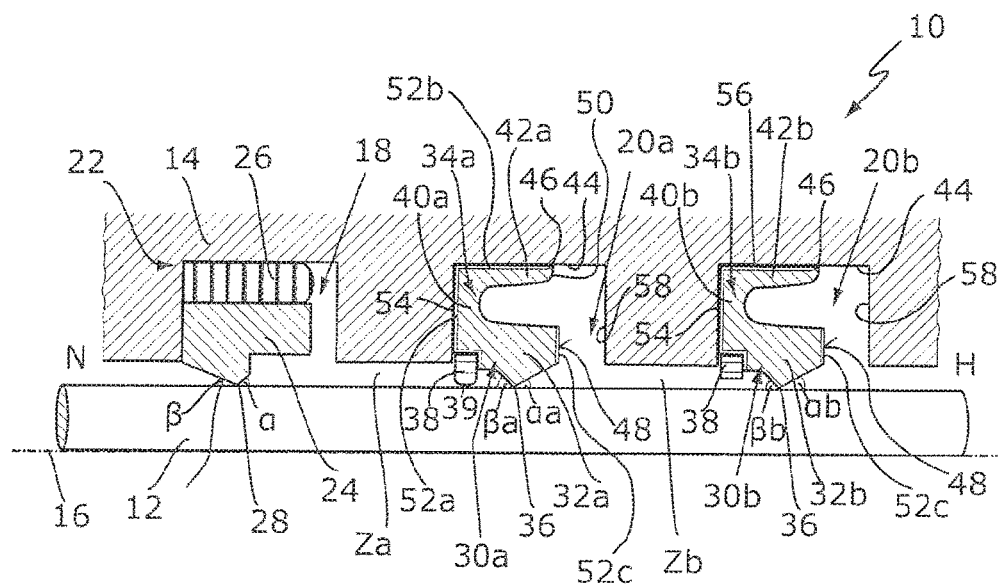
FIG. 1 shows a sealing system according to the invention in a base pressure situation, in a partial sectional representation.

FIG. 1 shows a sealing system 10 according to the invention between two mutually movable components for sealing off a high-pressure side H from a low-pressure side N.

An inner component 12 is arranged in an outer component 14 such that it can perform a translatory movement axially along a motional axis 16. The outer component 14 can be configured, for instance, as a cylindrical housing, and the inner component 12 as a piston rod of a piston guided in the housing. In FIG. 1, the upper half space of the sealing system 10 is shown in a partial longitudinal section. The outer component 14 has in total three annular grooves, which are open toward the inner component 12, a first annular groove 18, which is facing toward (disposed closer to) the low-pressure side N, and two second annular grooves 20a and 20b, which are arranged on (disposed closer to) the high-pressure side H. In the first annular groove 18 is provided a sealing arrangement 22. Naturally, the annular grooves can also be formed through the inner component.

The sealing arrangement 22 comprises a first sealing ring 24, made of an elastically deformable material, which bears against the inner component 12, and a first pretensioning ring 26, made of an elastically deformable material, which radially tensions the first sealing ring 24 and seals this off from the first annular groove 18. The first pretensioning ring 26 can be realized, for instance, as an O-ring. The sealing arrangement 22 serves as a primary seal, for which reason a sealing edge 28 of the first sealing ring 24 has a steep pressure gradient. The steep pressure gradient and the associated low leakage rate depends on a high-pressure-side contact surface angle α and a low-pressure-side contact surface angle β between the first sealing ring 24 and the inner component 12, wherein the high-pressure-side contact surface angle α exceeds the low-pressure-side contact surface angle β.

In the second annular groove 20a is arranged a first pressure relief element 30a, in the further second annular groove 20b a further pressure relief element 30b. The pressure relief elements 30a and 30b respectively comprise a second sealing ring 32a, 32b and a second pretensioning ring 34a, 34b. The second sealing rings 32a, 32b are tensioned by the second pretensioning rings 34a, 34b in the radial direction against the inner component 12.

The second sealing ring 32a, 32b and the second pretensioning ring 34a, 34b of both pressure relief elements 30a, 30b are respectively configured in one piece with each other and consist of elastically deformable polyurethane.

The second sealing rings 32a, 32b bear with their sealing edges 36 in each case sealingly against the inner component 12, wherein corresponding high-pressure-side contact surface angles $α_a$ and $α_b$ are respectively smaller than a corresponding low-pressure-side contact surface angle $β_a$ or $β_b$. The resulting shallow pressure gradient can also be attained by symmetrical, that is to say equal, contact surface angles on a sealing edge 36. In addition, the drag behavior can be influenced by a rounding of the respective sealing edge 36.

Through the arrangement of the sealing arrangement 22, the first pressure relief element 30a and the further pressure relief element 30b one behind the other, a first intermediate space $Z_a$ between the sealing arrangement 22 and the first pressure relief element 30a and a further intermediate space $Z_b$ between the first pressure relief element 30a and the further pressure relief element 30b are defined.

The pressure relief elements 30a, 30b are respectively provided with a support ring 38. The support rings 38 engage in an indentation (not detailed) of the second sealing rings 32a, 32b and can consist, for instance, of metal or a suitable viscoelastic plastic. The support rings 38 serve on the one hand to support the second sealing rings 32a, 32b in the radial direction. On the other hand, when the pressure relief elements 30a, 30b are pressurized on the high-pressure side, the support rings 38 serve to prevent or counter an unwanted extrusion of the second sealing rings 32a, 32b into the intermediate spaces $Z_a$ and $Z_b$ respectively. For the purpose of an, as far as possible, low-friction relative movement of the inner and outer component 12, 14, the two support rings 38 to the inner component 12 can respectively be arranged in a contact-free manner. One or more of the second support rings 38 can have an inner side 39 facing toward the inner component 12 and having shallow cone angles or having a radius, as is shown by way of example in FIG. 1 in respect of the second support ring 38 of the first pressure relief element 30a. Such a design of the inner side 39 of the support ring 38 is of advantage, in particular, where the support ring 38 bears against the inner component, in terms of a reduced friction of a fluid passage which may be necessary for the pressure equalization, as well as in terms of an increased life. Furthermore, the support ring 38 can also be provided with an axial through bore (or axial groove)—not represented in detail in the drawing—for the pressurized fluid, in order to enable a completely unimpeded (axial) passage of the fluid into the connecting channel.

The shallow pressure gradients at the sealing edges 36 permit respectively at the pressure relief elements 30a, 30b a (pre)determined leakage in the pressurized state and upon a translatory movement of the inner component 12 in the outer component 14. The respective leakage rate determines the hydraulic pressure in the intermediate space which on the low-pressure side borders the respective pressure relief element 30a, 30b, in the case of the first pressure relief element 30a the pressure $P_{Za}$ in the first intermediate space $Z_a$, in the case of the further pressure relief element 30b the pressure $P_{Zb}$ in the further intermediate space $Z_b$. The intermediate-space pressures $P_{Za}$ and $P_{Zb}$ are set such that a stepped increase from the pressure $P_N$ on the low-pressure side up to the pressure $P_H$ on the high-pressure side arises in the sealing system 10, $P_N < P_{Za} < P_{Zb} < P_H$.

The choice of specific intermediate-space pressures $P_{Za}$ and $P_{Zb}$ allows the production of an equal-level pressure cascade, in which the sealing arrangement 22, as well as both pressure relief elements 30a, 30b, in particular the first sealing ring 24 and both second sealing rings 32a, 32b, are loaded with the same pressure difference $P_{Za} - P_N = P_{Zb} - P_{Za} = P_H - P_{Zb}$.

In FIG. 1, the base pressure situation $P_N < P_{Za} < P_{Zb} < P_H$ of an intermediate-space cascade is shown. The sealing arrangement 22 bears on the low-pressure side against the first annular groove 18 and thus seals off the first intermediate space $Z_a$ from the low-pressure side N.

The second pretensioning rings 34a, 34b of the first and of the second pressure relief element 30a, 30b respectively have a substantially L-shaped cross section having a first leg 40a, 40b and a second leg 42a, 42b, configured as a sealing lip. The first leg 40a, 40b is molded onto the respective second sealing ring 32a, 32b and extends from the second sealing ring 32a, 32b radially in the direction of the groove bottom 44 of the respective second annular groove 20a, 20b. The second legs 42a, 42b respectively extend axially in the direction of the high-pressure side H of the sealing system 10. In the base pressure situation, the second legs 42a, 42b of the second pretensioning rings 34a, 34b bear sealingly with their sealing edge 46, in an elastically pretensioned manner, respectively against the groove bottom 44 of the second annular groove 20a, 20b. It should be noted that the second sealing rings 32a, 32b protrude, with their end face 48 facing toward the high-pressure side H, respectively over a free end 50 of the second leg 42a, 42b of the respective second pretensioning ring 34a, 34b, axially in the direction of the high-pressure side H. In the present case, the pressure relief elements 30a, 30b are arranged in the second annular grooves 20a, 20b with an axial play, but can also be arranged in the second annular grooves 20a, 20b without any such axial play.

Serving to equalize the pressure between the first intermediate space $Z_a$ and the further intermediate space $Z_b$, or between the second intermediate space $Z_b$ and the high-pressure side H, are connecting channels 52. In the present case, the connecting channels respectively comprise groove portions 52a, 52b, 52c in the second sealing rings 32a, 32b or the second pretensioning rings 34a, 34b of the pressure relief elements 30a, 30b.

The groove portions 52a are arranged on a (stepped) low-pressure-side end face 54 of the pressure relief elements 30a, 30b. The groove portions 52a can also partially be configured on the respective support rings 38.

The groove portions 52b are arranged on an outer side 56, facing toward the groove bottom 44, of the second pretensioning rings 34a, 34b of the pressure relief elements 30a, 30b and run axially in the direction of the sealing edge 46 assigned to the groove bottom 44. The groove portions 52c are respectively arranged on the high-pressure-side end face 48 of the second sealing rings 32a, 32b of the pressure relief elements 30a, 30b.

The groove portions 52c are arranged on the low-pressure side of the sealing edge 46 of the respective second pretensioning ring 34a, 34b. In the shown base pressure situation $P_{Za} < P_{Zb}$, the pressure relief element 30a, 30b bears on the low-pressure side against the respective second annular groove 20a, 20b. The groove portions 52a, 52b are sealed off from the groove portion 52c by the sealing edge 46, bearing against the groove bottom 44, of the second pretensioning rings 34a, 34b, i.e. the connecting channels 52 assigned to the two pressure relief elements 30a, 30b are respectively closed off in a functionally fluid-tight manner.

Figure 2:
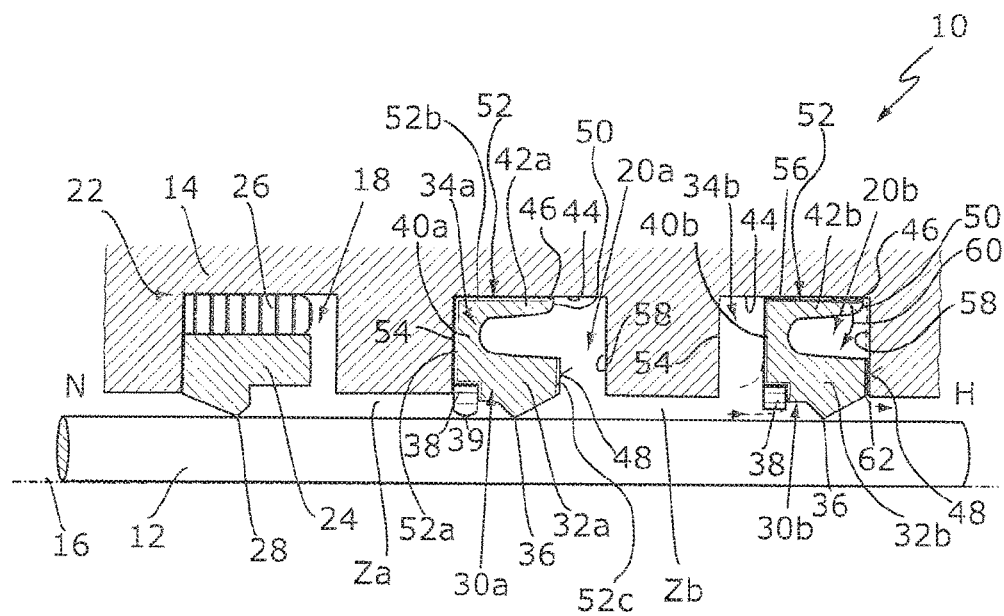
FIG. 2 shows the sealing system according to FIG. 1 in a pressure relief situation, in a partial sectional representation.

In FIG. 2 is represented how the position of those individual elements of the sealing system 10 according to the invention which are shown in FIG. 1 changes upon entry into a pressure relief situation $P_{Zb} \geq P_H + P_{crit}$.

In this pressure relief situation, the pressure $P_{Zb}$ in the further intermediate space $Z_b$ has risen above the pressure $P_H$ on the high-pressure side H, whereupon the further pressure relief element 30b has been displaced to the high-pressure side H and consequently bears with its high-pressure-side end face 48 against a high-pressure-side flank 58 of the second annular groove 20b.

As a result of a further rise in the intermediate-space pressure $P_{Zb}$, the second pretensioning ring 34b is activated and undergoes a (portional) deformation radially in the direction of the inner component 12, as is illustrated with the arrow 60. Upon this deformation of the second pretensioning ring 34b, the sealing edge 46, in the pressure relief situation $P_{Zb} \geq P_H + P_{crit}$, is lifted out of its sealing contact against the groove bottom 44 and, in this way, a fluidic connection of the intermediate space $Z_b$ via the groove portions 51a and 52b to the groove portion 52c, and hence to the high-pressure side H, is opened up. The pressure medium present in the intermediate space $Z_b$ flows along the flow direction 62 (shown in dashed representation) through the connecting channel 52 and thereby makes its way onto the high-pressure side H. This relieving of pressure in the further intermediate space $Z_b$ takes place up to the point at which the low-pressure-side overpressure no longer exceeds the pressure increase value $p_{crit}$, $p_{Zb} - p_H > p_{crit}$, and the second pretensioning ring 34b, due to its inherent natural elasticity, again comes to bear sealingly against the groove bottom 44 and in this way closes off the connecting channel 52 in a fluid-tight manner. Both the situation of the sealing arrangement 22 and the position of the first pressure relief element 30a remain unchanged, both in the pressure situation $P_{Zb} > P_H$ and in the pressure relief situation $P_{Zb} \geq P_H + P_{crit}$, since $P_N < P_{Za} < P_{Zb}$ continues to apply. The pressure relief of the further intermediate space $Z_b$ thus has no effects whatsoever on the sealing arrangement 22, which illustrates the effectiveness and advantageousness of a multistep pressure cascade for relieving the pressure of a primary seal.

It should be noted that the first sealing ring and the first pretensioning ring of the sealing arrangement 22 disposed in the first annular groove 18 are configured in one piece with each other in a manner corresponding to the pressure relief elements and can consist of polyurethane.

Naturally, the groove portions 52a, 52b and/or 52c can be arranged, at least partially, in that component 12, 14 which forms the second annular grooves 20a, 20b. Furthermore, the connecting channel 52 can comprise, instead of one or more of the above-described groove portions 52a, 52b, 52c, also one or more through bores, which extend through the pressure relief element 30a, 30b.

What is claimed is:

1. A sealing system between two components, which are translatorily movable relative to each other along a motional axis, for sealing off a high-pressure side from a low-pressure side;
   wherein an outer component has a first annular groove, which is open to an inner component and is facing toward the low-pressure side, and two second annular grooves, which are open to the inner component and are facing toward the high-pressure side;
   wherein in the first annular groove is provided a sealing arrangement, the sealing arrangement comprising a first sealing ring, made of an elastically deformable material, which bears against the inner component, and a first pretensioning ring, made of an elastically deformable material, which radially tensions the first sealing ring and seals it off from the first annular groove;
   wherein in respectively every second annular groove is provided a pressure relief element, each pressure relief element comprising a second sealing ring, made of an elastically deformable material, which bears against the inner component, and a second pretensioning ring, made of an elastically deformable material, which radially tensions the second sealing ring and seals it off from the second annular groove;
   wherein the second sealing ring has a sealing edge having a high-pressure-side contact surface angle and a low-pressure-side contact surface angle;
   wherein to each pressure relief element is assigned at least one connecting channel via which:
      an intermediate space between the sealing arrangement and the first pressure relief element is connectable to the high-pressure side; or
      an intermediate space between two adjacent pressure relief elements is connectable to the high-pressure side; or two adjacent intermediate spaces are connectable to each other via the connecting channel;

wherein each connecting channel, in a pressure situation $P_{ZN}>P_H$ or $P_{ZN}>P_{ZH}$, is closed and, in a pressure relief situation $P_{ZN} \geq P_H+P_{crit}$ or $P_{ZN} \geq P_{ZH}+P_{crit}$, is open;

wherein $P_H$ is the hydraulic pressure on the high-pressure side, $P_{ZN}$ the hydraulic pressure in the low-pressure-side intermediate space, $P_{ZH}$ the hydraulic pressure in the high-pressure-side intermediate space, and $P_{crit}$ a pressure increase value at which, or in excess of which, the connecting channel is open;

wherein $P_{crit}$ is defined by a deformation of the second pretensioning ring;

wherein the connecting channel, in the pressure situation $P_{ZN}>P_H$ or $P_{ZN}>P_{ZH}$, is closed off by the second pretensioning ring;

wherein the high-pressure-side contact surface angle of the sealing edge of the second sealing ring is less than or equal to the low-pressure-side contact surface angle of the sealing edge, so that in the pressurized state, and upon a to-and-fro movement of the inner component in the outer component, there is set for the second sealing ring a specific leakage rate, via which the hydraulic pressure in the low-pressure-side intermediate space is adjusted; and wherein the second sealing ring and the second pretensioning ring of the two pressure relief elements are respectively configured in one piece with each other and consist of polyurethane, wherein $P_{crit}$ is defined by an at least portional deformation of the second pretensioning ring in a direction radial to the motional axis, and wherein the sealing edge of the sealing ring of each pressure relief element is rounded, and wherein the second sealing ring of the two pressure relief elements are respectively provided with a support ring, and wherein the support ring of at least one pressure relief element has a radius solely on its inner side facing toward the inner component.

2. The sealing system as claimed in claim 1, wherein the first sealing ring and the first pretensioning ring of the sealing arrangement are configured in one piece with each other and consist of polyurethane.

3. The sealing system as claimed in claim 1, wherein the second pretensioning ring of the pressure relief element has a leg, which is configured in the manner of a sealing lip and which, in the pressure situation $P_{ZN}>P_H$ or $P_{ZN}>P_{ZH}$, bears with a sealing edge sealingly against the groove bottom of the second annular groove, and wherein the sealing-lip-like leg, in the pressure relief situation, is moved out of its sealing contact against the groove bottom.

4. The sealing system as claimed in claim 1, wherein at least one of the connecting channels comprises a through bore disposed in the pressure relief element, and/or groove portions which are configured on the pressure relief element and/or in the outer component and are open toward the second annular groove.

5. The sealing system as claimed in claim 4, wherein one of the groove portions is disposed on a low-pressure-side end face of the pressure relief element, or on an outer side, facing toward the groove bottom of the second annular groove, of the second pretensioning ring, or on an end face, facing toward the high-pressure side, of the second sealing ring of the pressure relief element.

6. The sealing system as claimed in claim 1, wherein the outer component is a cylindrical housing and the inner component is a piston rod of a piston guided in the cylindrical housing.

7. The sealing system as claimed in claim 1, wherein the second sealing ring of at least one pressure relief element is provided with a support ring, which has an inner side facing toward the inner component and having shallow cone angles or having a radius.

8. The use of a sealing system as claimed in claim 1 to produce an intermediate-space pressure cascade, wherein the hydraulic pressures in the intermediate spaces are set such that at every second sealing ring the same pressure difference is obtained.

* * * * *